Nov. 15, 1949       H. C. WENDT       2,488,358
GYROSCOPE ERECTING DEVICE
Filed Dec. 22, 1945
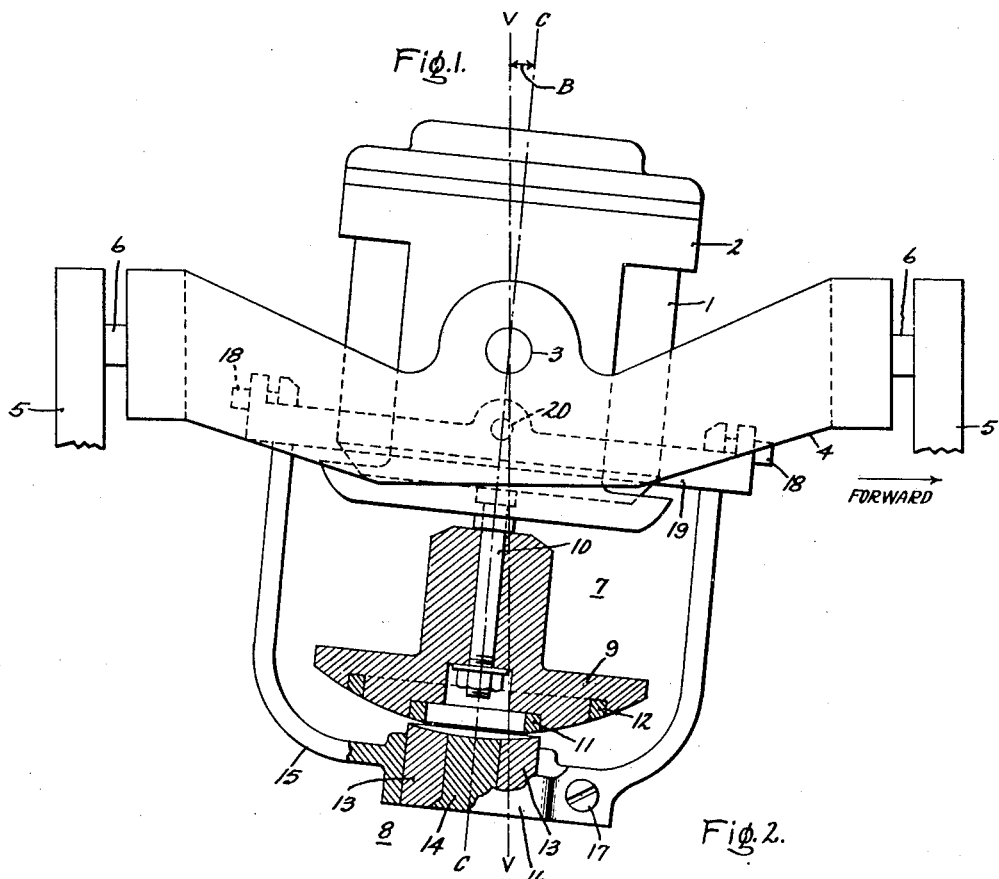
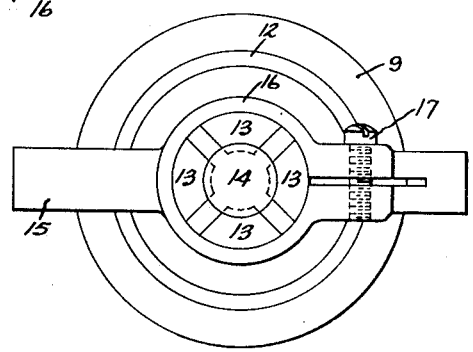
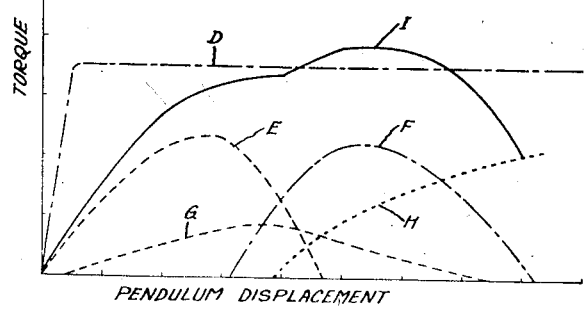
Inventor
Harry C. Wendt,
by Claude N. Moss
His Attorney.

Patented Nov. 15, 1949

2,488,358

UNITED STATES PATENT OFFICE 2,488,358

GYROSCOPE ERECTING DEVICE

Harry C. Wendt, Lynnfield, Mass., assignor to General Electric Company, a corporation of New York Application December 22, 1945, Serial No. 636,673

6 Claims. (Cl. 74—5.46)

1

The present invention relates to gyroscopes, and more particularly to an improved erecting device for gyroscopes of the vertical spin axis type.

Gyroscopes of the vertical spin axis type which are sometimes referred to as gyro verticals, are customarily provided with an erecting device for maintaining the spin axis of the gyroscope approximately in the vertical reference position. A common type of erecting device comprises an eddy current disk mounted on and driven by the gyroscope, the disk cooperating with a permanent magnet which is mounted to swing beneath the disk as a pendulum. Eddy currents are induced in the disk resulting in drag torques which precess the gyroscope into correspondence with the gravity-positioned magnet whereby the gyroscope is slowly and continuously erected to, and maintained in, the reference position. With such an erecting device involving a gravity-positioned element, an error known as "turn error" is encountered when the gyroscope is used on a moving vehicle such as an aircraft. This error is caused by the fact that the pendulum is swung away from the true vertical by centrifugal action during turns so that the gyroscope is precessed away from the true reference position. It has been found that this error can be reduced or eliminated under a variety of predetermined conditions of operation by the expedients of initially tipping the spin axis of the gyroscope in the direction of motion of the vehicle, and by designing the erection system so that a predetermined relationship is obtained between displacement of the pendulum and the precession rate of the gyroscope.

In the U. S. Patent No. 2,418,032 in the name of R. G. Jewell, issued March 25, 1947, which is assigned to the same assignee as the present invention, there is disclosed an erecting device for a gyro vertical in which the desired torque versus pendulum displacement characteristic required for turn error compensation is obtained by a special shaping of the eddy current disk. By properly shaping the disk, it is possible to obtain an effective air gap between the magnet and the disk which varies in accordance with the displacement of the pendulum. Since the magnitudes of the induced eddy currents, and consequently the net drag torque, vary with the air gap, the desired variation of torque with displacement can be obtained. However, in mass production of gyroscopes, it has been found difficult to maintain the erection characteristic constant with this arrangement because of the fact that the erecting device is very sensitive to the initial air gap adjustment between the magnet and the eddy current disk. Since the torque varies very rapidly with air gap, any initial error in adjustment causes a rather wide departure from the desired torque versus displacement characteristic.

An object of the present invention is to provide an improved erecting device for a gyroscope.

Another object is to provide a gyroscope erecting device which can be easily designed to give any desired erection characteristic for turn error compensation or for any other purpose.

A further object is to provide an eddy current erecting device which is not senstive to initial adjustment of the air gap between the magnet and the eddy current disk.

Further objects and advantages of my invention will become apparent and my invention will be better understood from the following description referring to the accompanying drawing and the features of novelty which characterize my invention will be pointed out with particularity in the appended claims which form a part of this specification.

In the drawing, Fig. 1 is a side elevation view, partly in section, of a gyroscope provided with an erecting device embodying my invention;

Fig. 2 is a bottom view of the erecting device shown in Fig. 1;

Fig. 3 is a graphical representation useful in describing the operation of the invention.

Referring to Fig. 1 of the drawing, I have shown a gyroscope of the vertical spin axis type which may for example be embodied in an aircraft instrument known as an artificial horizon. The gyroscope is shown as comprising a rotor 1 which is mounted in a rotor bearing frame 2 so that the rotor is free to rotate about the gyroscope spin axis indicated by the line C—C. The gyroscope is driven by any suitable motor means, such as an electric or pneumatic motor (not shown). The rotor bearing frame is provided with two horizontally extending trunnions 3, only one of which is shown, the trunnions being pivotally mounted on a gimbal 4 so as to permit pivotal movement of the bearing frame about the horizontal axis defined by the trunnions 3. The gimbal 4 is in turn pivotally mounted on fixed supports 5 by means of trunnions 6, so that the gimbal is free to pivot about a horizontal axis defined by the trunnions 6 which is at right angles to the pivotal axis defined by the trunnions 3. There is thus provided a conventional Cardan suspension which permits universal movement of the gyroscope relative to the fixed supports 5. Due to gyroscopic inertia, the gyroscope tends to maintain the orientation of its spin axis C—C fixed in space.

Because there is a certain amount of friction in the trunnion bearings, and also because of rotation of the earth, the gyroscope tends to wander from its reference position and it is therefore necessary to provide an erecting device for maintaining the spin axis of the gyroscope in the reference position.

According to the present invention I have provided a novel and improved erecting device comprising a rotating conductor member 7 and a cooperating pendulously mounted magnet member 8.

As shown, the conductor member 7 comprises a support 9 which is rigidly mounted on a shaft 10. The shaft 10 may be, as shown, an extension of the shaft which supports the gyroscope rotor 1 so that the support 9 is rotated when the gyroscope is in operation. The lower portion of the support 9 is formed in the shape of a disk, the lower surface of which has a curvature the radius of which is determined by the radius of swing of the magnet member 8. The lower surface of the support 9 is provided with suitable grooves in which are inserted or fitted two annular rings 11 and 12. Both of the rings 11 and 12 are concentric with the axis of rotation of the conductor member 7, the ring 12 being of larger diameter than the ring 11, as shown. For reasons which will become apparent as the description proceeds, the support 9 is formed of a material such as brass, which has a relatively low electrical conductivity, while the rings 11 and 12 are formed of a material having relatively high electrical conductivity such as copper or aluminum.

The pendulous magnet member 8 is provided with a magnetic structure arranged to produce a magnetic field flowing through the conductor member 7. While the form of the magnetic structure used is immaterial to the present invention, I have shown for the purposes of illustration a magnetic structure comprising a plurality of permanent magnets 13 which are arranged in a circle with the axes of the magnets extending in a vertical direction. The magnets 13 are held in a spaced circular form by means of a suitable nonmagnetic support 14. The magnet assembly is supported on a pendulum or bail 15 which has an open circular center portion 16 which is clamped around the magnet assembly by means of a screw 17.

In order to obtain universal movement of the magnet assembly, the pendulum 15 is provided with trunnions 18 by means of which the pendulum is pivotally mounted on a supplementary horizontal gimbal member 19. The gimbal member 19 is in turn pivotally mounted on the bearing frame 2 by means of trunnions, one of which is shown at 20. The axes determined by the trunnions 18 and 20 are mutually perpendicular so that universal movement of the pendulum is permitted. It may be pointed out here that it is not necessary to the present invention that the pendulum 15 be mounted on the rotor bearing frame 2 as it may equally well be mounted on the fixed supports 5.

As shown in Figs. 1 and 2, the erection system is in what may be termed a neutral position. It will be noted that in this position the axis of rotation of the conductor member 7 is coincident with the axis of symmetry of the magnetic field produced by the permanent magnets 13. It will also be noted that in this position the permanent magnets 13 just overlap the conductor ring 11, the conductor ring 11 and the circular permanent magnets 13 having approximately the same radius of curvature. When the gyroscope is operating and the conductor member 7 is therefore rotating, the magnetic fields produced by the permanent magnets 13 cause eddy currents to be induced in the various parts of the conductor member. As a result there is a reactive drag torque exerted on the conductor member, and consequently on the gyroscope. When the magnet member 8 is in the neutral position shown, the drag torque is symmetrical with respect to the spin axis of the gyroscope so that the net torque tending to precess the gyroscope is zero. However, if relative tilt occurs between the conductor member 7 and the magnet member 8, the drag torque becomes unbalanced and results in a torque being applied to the gyroscope at right angles to the direction of tilt. As a result of this unbalanced torque, the gyroscope is precessed in a direction to restore correspondence between the magnet member 8 and the conductor member 7. Since the magnet member 8 is positioned by gravity, it will be apparent that, as a result of the eddy current erecting action, the gyroscope will be continuously precessed to a predetermined reference position in which the axes of the magnet member 8 and the conductor member 7 are in correspondence.

As pointed out above, gyro verticals having erecting devices comprising pendulous elements are subject to an error known as turn error when they are mounted on moving vehicles such as aircraft. This error occurs during turns when the pendulous element is swung away from the true vertical by centrifugal action. In order to eliminate or reduce this error for the predetermined conditions of operation, the pendulum is adjusted so that the spin axis of the gyroscope is normally tipped a small amount in the direction of movement of the vehicle on which the gyroscope is mounted. Referring to Fig. 1 of the drawing, it will be noted that the gyroscope spin axis C—C is tipped away from the true vertical, designated by the line V—V, the angle of tip being designated by the symbol $\beta$. Normally the angle $\beta$ is of the order of 2½ degrees. The angle $\beta$ is measured in a plane parallel to the fore and aft axis of the vehicle on which the gyroscope is mounted, which plane includes the true vertical line V—V and the gyro spin axis line B—B. The direction of tip is such that the top of the gyroscope frame leans in a forward direction indicated by the arrow. The tipping of the gyro spin axis in the normal reference position is accomplished by adjustment of the balance of the pendulum. Thus, in the illustrated embodiment of the invention, the clamping screw 17 may be selected of proper weight such that when the pendulous magnet is in a position of rest, the center of the magnet assembly is somewhat to the rear of the true vertical line V—V passing through the center of suspension of the gyroscope as shown in Fig. 1.

With the spin axis of the gyroscope tipped as shown, the effect of turn error can be eliminated if the erecting device is so designed that when the pendulum swings out during a turn the gyroscope is caused to precess about the true vertical at a rate just equal to the rate of turn of the vehicle on which the gyroscope is mounted. If such a relationship is maintained, there will be no apparent turn error in the position of the gyroscope since the orientation of the gyroscope spin axis relative to the vehicle on which it is mounted remains unchanged during the turn.

One of the principal advantages of the present erecting device comprising the multiple, concentric, conductor rings 11 and 12 is that the desired gyroscope erection characteristic required for turn error compensation can be easily obtained, as will now be described.

As pointed out in the above-mentioned Jewell application, complete turn error compensation for all vehicle speeds and one predetermined rate of turn can be obtained if the erecting device is designed so that the precessing torque, and hence the gyro precessing rate, remains substantially constant for various angles of tilt between the pendulum and the gyroscope which are encountered in normal operation of the device. This desired characteristic is indicated by the curve D shown in Fig. 6 of the drawing which shows the relationship between pendulum displacement or tilt and the precessing torque exerted on the gyroscope. As disclosed in the above-mentioned Jewell application, this desired characteristic is approximated by shaping the eddy current disk or conducting member in such a manner that the air gap between the disk and the magnet varies as the pendulum swings away from the central or neutral position. According to the present invention, this desired erection characteristic may be obtained independently of any air gap variation between the eddy current conductor member and the magnet whereby the erecting device is much less sensitive to initial adjustment and can be more accurately controlled in mass production.

According to the present invention the desired erection characteristic is obtained by suitably selecting the diameters and the cross-sectional areas of the conductor rings or inserts 11 and 12. The interaction of the various factors involved can most easily be seen by reference to the curves shown in Fig. 3. The curve E indicates the component of the eddy current drag torque which is contributed by the conductor ring 11, while the curve F represents the component contributed by the conductor ring 12. Some eddy currents are induced in the support 9, but due to the fact that the support is formed of a material having a relatively low conductivity, such as brass, the eddy currents induced in the support are not so effective in producing drag torque as the eddy currents which are induced in the high conductivity conductor rings 11 and 12. The curve G represents approximately the component of the drag torque which is contributed by the portion of the support 9 lying between the rings 11 and 12, while the curve H represents approximately the component of drag net torque contributed by the eddy currents induced in the support 9 at radial distances from the center of the conductor member greater than that of the outer conducting ring 12.

As indicated by the curve F, the conductor member 12 does not become effective to produce eddy current drag torque until the magnet member 8 has swung far enough away from the neutral position so that overlap occurs between the magnets 13 and the conductor ring 12. It will be apparent that by properly selecting the diameter of the conducting ring 12, this ring can be made to become effective in producing torque at an angular displacement of the magnet member 8 at which the torque produced by the inner conductor ring 11 begins to fall off. It will also be apparent that by properly selecting the cross-sectional areas of the conductor rings 11 and 12, the peak values of the torques produced by these rings can be varied as desired. In Fig. 3 the curve I represents the resultant or sum of the curves E, F, G, and H, the diameters and cross-sectional areas of the rings 11 and 12 having been selected in the illustrated embodiment to give a resultant curve which approximates the desired curve D over a relatively wide range of pendulum displacement. The curve D having been approximated, correction for turn error is therefore obtained at all vehicle speeds and at one predetermined rate of turn as explained above.

In some cases it may be desirable to form the support 9 of material which is electrically non-conducting so that the effect of the curves G and H do not have to be reckoned with in determining the shape of the resultant curve I. In general, however, it is desirable to form the support 9 of metallic material for strength purposes, and therefore the eddy currents induced in the support have to be considered. However, by the use of a composite construction in which the rings 11 and 12 are formed of a material having a relatively high conductivity and the support 9 of material having relatively low conductivity, adequate control of the erection curve is obtained independently of any variation of the air gap between the pendulous magnet 8 and the conductor member 7. My erection device therefore has the advantage that the shape of the erection curve is not sensitive to the initial adjustment of the air gap between the magnet and the eddy current conductor, and therefore this construction facilitates obtaining uniform erection curves in mass production of gyroscopes.

A still further control of the erection curve may be obtained by forming the conductor rings 11 and 12 of materials having relatively different electrical conductivities. Thus, in some cases it may be found that if both rings 11 and 12 are formed of a high conductivity material such as copper, the cross-sectional area of one of the rings may have to be reduced in obtaining the desired characteristic to the point where it is mechanically weak and difficult to secure in place. In such a case the ring may be formed of a material having a relatively lower conductivity such as aluminum, thereby permitting the use of a greater cross-sectional area with a concomitant increase of strength and ease of manufacture.

My invention is not limited to the illustrated geometrical arrangement in which two concentric conductor rings are used, since obviously any number of rings may be used, depending upon the accuracy and shape of the erection curve desired. In some cases an erection characteristic may be desired which will give turn error compensation for all rates of turn at one predetermined vehicle speed. It can be shown that this result is obtained if the erection curve has a characteristic such that the precessing torque and rate vary approximately as the tangent of the relative angular displacement between the pendulum and the gyroscope. With my invention such a characteristic can be easily obtained by suitably selecting the number, diameter, and cross-sectional areas of the conductor rings, as will be clear from the foregoing illustration of the way in which the factors affecting the shape of the erection curve may be varied.

It should be understood that my invention is not limited to the illustrated arrangement in which the conductor member is rotated and the magnet is relatively stationary, as obviously the reverse arrangement may be used; i. e. the magnet may be rotated with the conductor member relatively stationary. Furthermore, if desired, the rotating member may be driven by a separate drive motor mounted on either the pendulum or the gyroscope bearing frame.

It will be apparent from the foregoing that I have provided an improved eddy current erecting device for a gyroscope which is simple in construction, inexpensive to manufacture, and which is highly flexible so that by suitable design any desired erection characteristics can be obtained and controlled for turn error correction or for other purposes.

While I have shown and described particular embodiments of my invention, it will occur to those skilled in the art that various changes and modifications may be made without departing from my invention and I therefore aim in the appended claims to cover all such changes and modifications as fall within the true spirit and scope of my invention.

What I claim as new and desire to secure by Letters Patent of the United States, is:

1. An erection device for a gyroscope comprising a magnet mounted for movement relative to said gyroscope, a conductor member mounted on and driven by said gyroscope so as to rotate in the field produced by said magnet, said conductor member being of a composite construction and comprising a support formed of material having relatively low electrical conductivity and a plurality of different diameter rings of higher conductivity material mounted on said support and arranged concentric with the axis of rotation thereof, said rings being spaced such that a precessing torque is exerted on said gyroscope that is approximately constant over a relatively wide range of displacement of said magnet member relative to said conductor member.

2. In combination with a universally mounted gyroscope of the vertical spin axis type, an eddy current erecting device therefor comprising a magnet member for producing a magnetic field, a conductor member, one of said members being mounted on said gyroscope for rotation with the rotor thereof and the other of said members being pendulously mounted so as to swing adjacent the member mounted on the gyroscope under the influence of gravity, whereby the relative rotation between the field produced by said magnet member and said conductor member results in eddy currents being induced in said conductor member producing torques tending to erect said gyroscope, said conductor member being of composite construction and formed of a plurality of conducting materials having different electrical conductivities so arranged that as said magnet member is relatively displaced from a neutral position the magnet flux provided thereby threads different ones of said materials, the torque characteristic of said erecting device being a predetermined function of the geometrical pattern of said materials.

3. In combination with a universally mounted gyroscope of the vertical spin axis type, an eddy current erecting device therefor comprising a magnet member for producing a magnetic field, a conductor member, one of said members being mounted on said gyroscope for rotation with the rotor thereof and the other of said members being pendulously mounted so as to swing adjacent the member mounted on the gyroscope under the influence of gravity, whereby the relative rotation between the field produced by said magnet member and said conductor member results in eddy currents being induced in said conductor member producing torques tending to erect said gyroscope, said conductor member being of composite construction comprising a supporting member and a plurality of ring members having electrical conductivities different from said supporting member, said ring members being of different diameters and so positioned that as said magnet member is relatively displaced from a vertical position, the flux produced thereby threads progressively different ones of said ring members and said supporting member, the torque characteristic of said erecting device being a predetermined function of the diameter and cross sectional area of said ring members.

4. An erection device for a gyroscope comprising a magnet mounted for movement relative to said gyroscope, a conductor member mounted on and driven by said gyroscope so as to rotate in the field produced by said magnet, said conductor member being of composite construction comprising a supporting member and a plurality of radially spaced ring members concentric with the axis of rotation of said conductor member, said ring members having electrical conductivities different from the conductivity of said supporting member, the torque characteristic of said erecting device being a predetermined function of the diameter of said ring members.

5. An erection device for a gyroscope comprising a magnet mounted for movement relative to said gyroscope, a conductor member mounted on and driven by said gyroscope so as to rotate in the field produced by said magnet, said conductor member being of composite construction comprising a supporting member and a plurality of radially spaced ring members concentric with the axis of rotation of said conductor member, said ring members having electrical conductivities different from the conductivity of said supporting member and different from each other, the torque characteristic of said erecting device being a predetermined function of the diameter of said ring members, and their relative electrical conductivities.

6. An erection device for a gyroscope comprising a magnet mounted for movement relative to said gyroscope, a conductor member mounted on and driven by said gyroscope so as to rotate in the field produced by said magnet, said conductor member having a curved lower surface adjacent said magnet member, said lower surface having circular grooves of different diameters concentric with the axis of rotation of said conductor member, and ring members fitted into said grooves so as to form a continuation of said lower surface, said ring members being formed of conducting material having electrical conductivity greater than that of the surrounding material.

HARRY C. WENDT.

REFERENCES CITED

The following references are of record in the file of this patent:

UNITED STATES PATENTS

| Number | Name | Date |
|---|---|---|
| 2,229,645 | Esval et al. | Jan. 28, 1941 |
| 2,339,606 | Sias | Jan. 18, 1944 |
| 2,360,339 | Hansen | Oct. 17, 1944 |
| 2,418,032 | Jewell | Mar. 25, 1947 |

FOREIGN PATENTS

| Number | Country | Date |
|---|---|---|
| 359,071 | Great Britain | Mar. 16, 1931 |